March 14, 1961  A. K. ROEBUCK ET AL  2,975,223
ALKYLATION PROCESS
Filed Dec. 4, 1957  2 Sheets-Sheet 1

INVENTORS:
Alan K. Roebuck
Bernard L. Evering
William W. Sanders
BY Joseph C. Kotarski
ATTORNEY United States Patent Office 2,975,223
Patented Mar. 14, 1961

2,975,223

ALKYLATION PROCESS

Alan K. Roebuck, Dyer, Ind., and Bernard L. Evering, Chicago, and William W. Sanders, Crete, Ill., assignors to Standard Oil Company, Chicago, Ill., a corporation of Indiana Filed Dec. 4, 1957, Ser. No. 700,602

2 Claims. (Cl. 260—683.53)

This invention relates to an improved process for alkylating isoparaffins with olefins, and it particularly concerns alkylation systems wherein an aluminum chloride-ether catalyst is employed.

The present invention makes it possible for petroleum refiners to make isoparaffin-olefin alkylate having a clear F–1 octane number of 100 to 103. This is far superior to present day commercial alkylation processes which employ sulfuric acid or hydrogen fluoride and which produce alkylates having a clear F–1 octane of between about 88 to 95. In present day processes it is even difficult to produce alkylate having a F–1 clear octane of 95 because of the careful operation and reduced throughputs which are required. Ordinarily the octane number averages between 93 and 94 F–1 clear.

Figure 2:
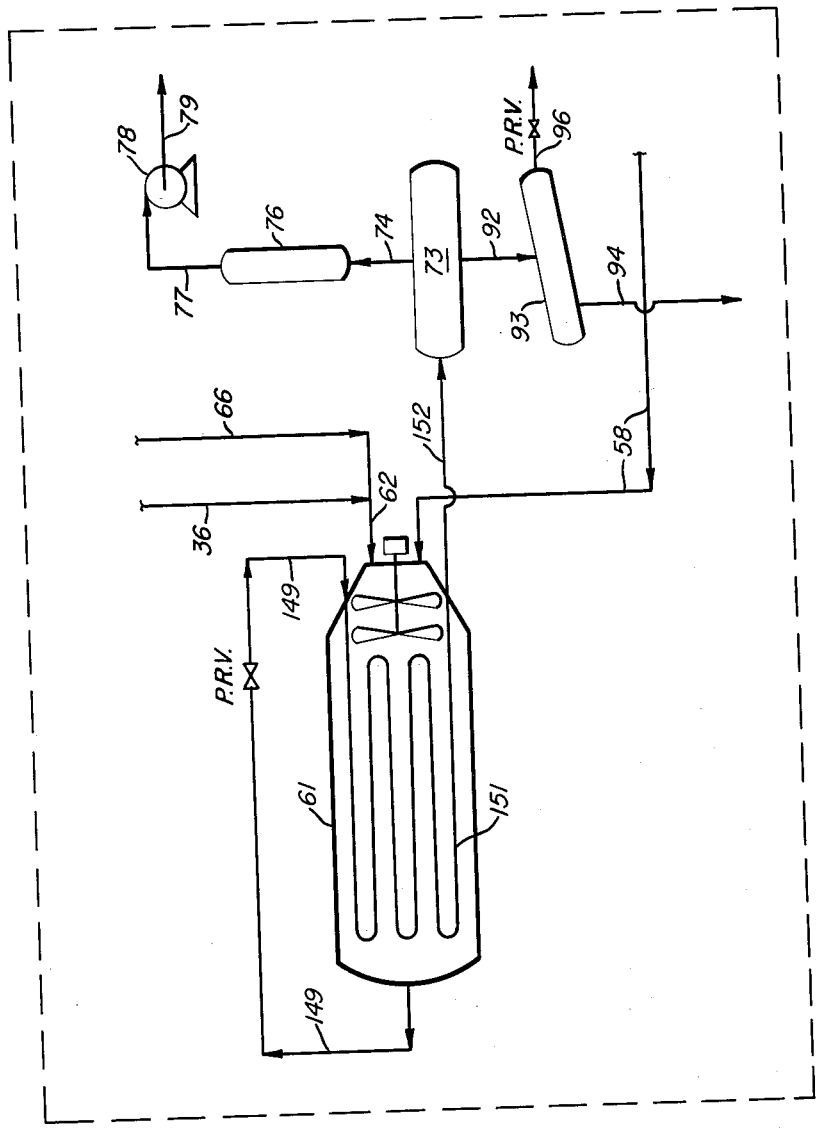

Toward the upper limit of the octane number scale, i.e. 95–100, an apparently very minor increase of 1 to 2 units represents a much greater increase in the performance of the fuel than the same units do at a lower point in the octane scale. For example, the 101 F–1 clear isobutane-butylene alkylate which is producible by this invention has 20 to 25% greater power output than does the 94 F–1 clear alkylate produced by present day commercial processes. This may be seen from "Aviation Gasoline Manufacture" by Van Winkle, Figure 2–IX, page 238, McGraw-Hill (1944). This difference in power output also exists when TEL is added to the alkylate. Thus, the 101 F–1 alkylate to which 3 cc. TEL is added has a performance number of 147, whereas 95 F–1 alkylate to which 3 cc. TEL is added has a performance number of only 119. The tremendous importance of producing alkylate of 100–103 F–1 clear alkylate is believed evident.

An object of the present invention is to provide a process for alkylating isoparaffins with olefins which produces high octane alkylate in good yields. Another object of the invention is to provide fractions of alkylate with particularly high octane number. A further object is to provide a novel alkylation catalyst composition which is useable at low temperatures, which is capable of producing higher octane alkylate than related catalysts, and which simplifies the recovery of catalyst components from the alkylate. A still further object is to provide a method for carrying out an alkylation process which sustains catalyst activity at a very high level over a long period of time thereby providing a continuous alkylation process which produces alkylate of high octane number in high yields. An additional object of the invention is to provide a process for recovering soluble catalyst components from the hydrocarbon effluent of the alkylation process. Yet another object is to provide a process which integrates cooling of the alkylation reaction with recovery of the soluble catalyst components from the hydrocarbon effluent. A further object is to provide a method for purifying an alkylation catalyst and thereby assisting in maintaining its activity while at the same time recovering catalyst components during the purification step and purifying isoparaffin feed to the alkylation process. These and other objects will be apparent from the detailed description of the invention which is discussed herein.

The present invention has many inventive aspects. In all of its aspects, however, an aluminum chloride-ether catalyst, containing in excess of one mole of aluminum chloride per mole of a low molecular weight ether, is involved. The background of the alkylation process within which the various inventive aspects may be used consists of contacting an isoparaffin such as isobutane, isopentane, etc. with an olefin, e.g. one having from 2 to 6 carbon atoms under liquid phase conditions with the above-mentioned aluminum chloride-ether catalyst, which is also a liquid, under alkylation reaction conditions. Alkylation temperatures of from about 20 to preferably not more than about 80° F. (although somewhat higher temperatures may be used) and sufficient pressure to maintain the reactants in the liquid phase are used. Upon intimate contact of the reactants with the catalyst an alkylate is produced. The alkylate is separated from the catalyst and recovered, while the catalyst is returned to the alkylation reaction.

One aspect of the invention concerns the alkylation of olefins having at least 4 carbon atoms. Such olefins are usually available commercially as mixtures of olefin isomers containing 1-olefins. The 1-olefin, or olefin mixtures containing the 1-olefin, are isomerized to shift the double bond to an interior position within the olefin molecule. The isomerized olefins are then employed to alkylate the isoparaffin in the manner discussed above. An unexpectedly great improvement in octane number results from the isomerization step when using the particular alkylation catalyst employed in this process.

Another aspect of the invention concerns carrying out the alkylation of the isoparaffin with certain olefins (i.e. propene, secondary and tertiary olefins) in the presence of a minor amount of an aromatic hydrocarbon based upon isoparaffin and olefin. The aromatic hydrocarbon is preferably mononuclear, for example, a polyalkyl benzene such as xylene, etc. The aromatic hydrocarbon may be employed in an amount between about .001 and 2% by weight based upon hydrocarbon reactants. It may be present in the reaction zone in an amount of between about 1 and 50% by weight based upon the catalyst in the reaction zone. Many of the aromatic hydrocarbons that can be employed for this purpose will become alkylated during the alkylation process. Upon fractionation of the alkylate, a fraction boiling above the gasoline boiling range which is rich in alkylated aromatic hydrocarbons can be recovered and employed in the alkylation reaction. By using the aromatic hydrocarbon during the course of the alkylation of the stated olefins, the octane number of the alkylate may be improved by as much as ten units.

Another aspect of the invention concerns fractionating an alkylate which has been produced by alkylating isobutane with a mixture of butene-2 and isobutene in the presence of a minor amount of aromatic hydrocarbon while using the stated aluminum chloride-ether catalyst, so as to recover higher octane blending fractions therefrom. The alkylate so produced may be fractionated to remove hydrocarbon components boiling below about 180 to 200° F. while recovering the higher boiling hydrocarbon components. When fractionating at a cutpoint of 180° F. only about 5% of the $C_5+$ alkylate is removed overhead, but this results in an increase of about 0.5 octane number in the higher boiling alkylate. When fractionating at a cutpoint of about 220° F., the overhead alkylate (which comprises approximately 50%–60% of the $C_5+$ alkylate charged to fractionation) will have an octane number about 3 units less than the higher boiling fraction of the alkylate. A select high octane fraction of the alkylate which boils between about 220° and 240° F. can also be recovered for blending purposes where needed.

Another aspect of the invention concerns an aluminum chloride-ether catalyst of novel composition. The ether component of this novel catalyst consists of a mixture of methyl ether and ethyl ether wherein the relative amounts of each range between 75 to 25% by volume of methyl ether and 25 to 75% by volume of ethyl ether, for example a mixture of methyl and ethyl ether in about a 1:1 volumetric ratio. The catalyst contains in excess of one mole of aluminum chloride per each mole of ether present. Such compositions have low freezing points, i.e., as low as 20-25° F., and therefore may be used in an alkylation process as a liquid catalyst at such low temperatures whereby higher octane alkylates are produced. It is also highly advantageous because this type of aluminum chloride-ether catalyst exists as a liquid rather than as a solid in certain of the processing steps involved in the alkylation process.

Because a portion of the aluminum chloride-ether catalyst is soluble in the liquid hydrocarbon alkylate and would be lost from the alkylation process, it is desirable to recover the soluble catalyst components from the liquid alkylate. One aspect of this invention cools the withdrawn liquid hydrocarbon alkylation products thereby causing aluminum chloride and ether which is soluble therein to become insoluble. The insoluble catalyst components are then separated and used as a portion of the catalyst in the alkylation reactor. The cooling step may suitably be carried out after the bulk of the insoluble catalyst has been separated from the alkylation products. Insolubilization may also be achieved by vaporizing a portion of the low boiling hydrocarbons from the liquid alkylate. A combination of cooling and vaporization may be effected by reducing the pressure on the hydrocarbon alkylation products and vaporizing low-boiling hydrocarbons therefrom. Substantial amounts of aluminum chloride and ether are thereby rendered insoluble in the liquid hydrocarbons. A portion of this cooling effect can be used to remove heat from the alkylation reaction zone by using indirect heat exchange means. By effecting cooling in the presence of a small amount of aluminum chloride-hydrocarbon complex, a lower cooling temperature can be employed without causing the formation of a solid aluminum chloride-ether composition.

After the alkylation process has been on stream for a time, aluminum chloride-hydrocarbon complexes are formed which are miscible with the aluminum chloride-ether catalyst. In one aspect of the invention, a catalyst phase comprised of aluminum chloride-ether catalyst containing aluminum chloride-hydrocarbon complex is removed from the alkylation process and contacted with a liquefied normally gaseous hydrocarbon. Aluminum chloride and ether components are dissolved by the liquefied gaseous hydrocarbon in preference to the aluminum chloride-hydrocarbon complex. The latter may then be discarded, and the aluminum chloride and ether composition which is recovered may be employed as a portion of the alkylation catalyst. When liquefied isobutane, which is to be used as the isoparaffin feed to the alkylation reactor, is contacted with the aluminum chloride-ether catalyst containing the aluminum chloride-hydrocarbon complex, the isobutane is simultaneously purified for use in the alkylation reaction.

In the alkylation process, the aluminum chloride-ether catalyst is recovered from the alkylation products and is recycled to the reactor. One aspect of the invention concerns introducing aluminum chloride into the alkylation reaction zone. The introduced aluminum chloride particles function to replenish the supply of dissolved aluminum chloride in the liquid aluminum chloride-ether catalyst, since aluminum chloride is lost in the process by reason of formation of aluminum chloride-hydrocarbon complex, reaction with impurities in the hydrocarbon reactants, etc. The introduced aluminum chloride insures saturation of the liquid aluminum chloride-ether catalyst in the alkylation reaction zone.

Figure 1:
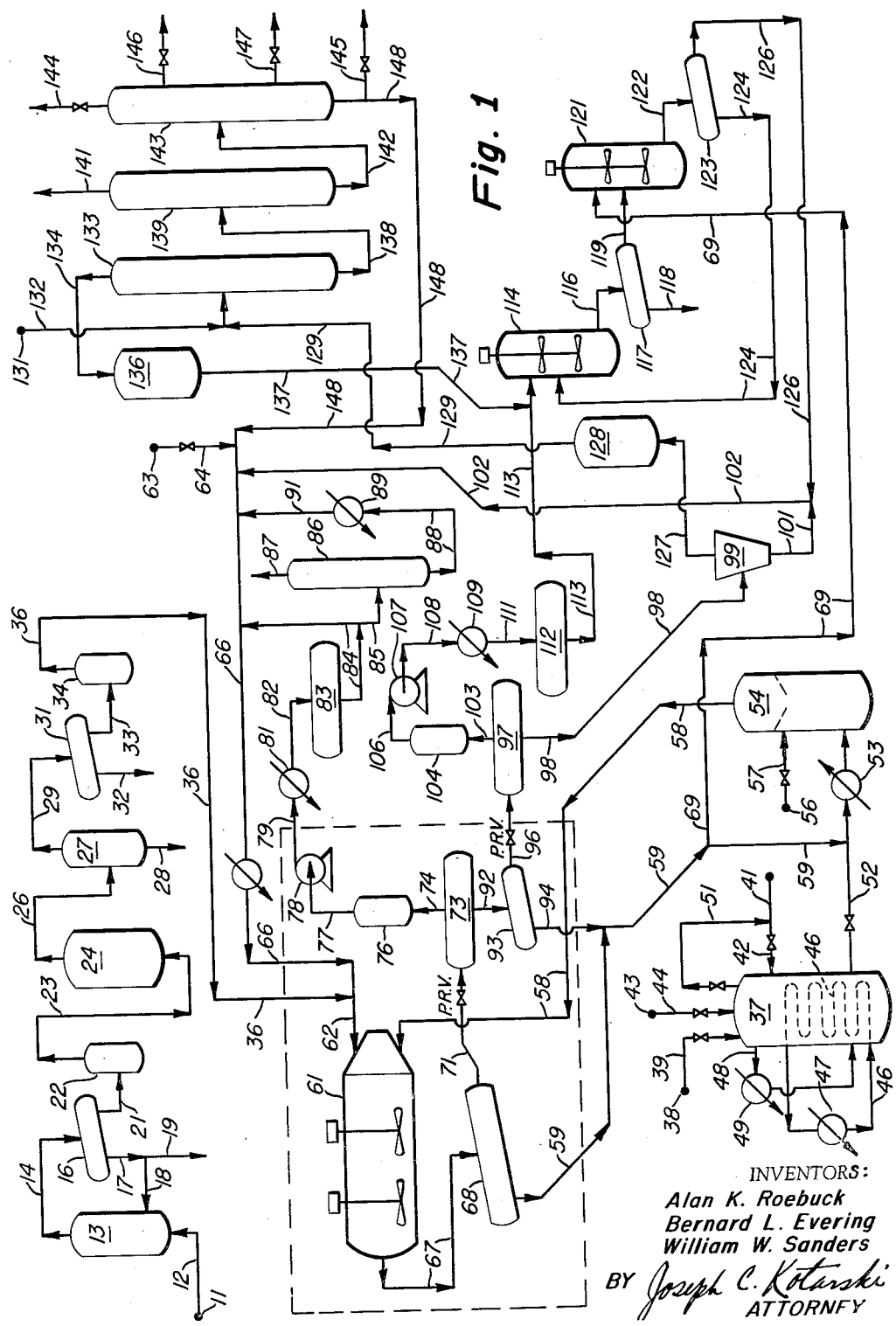

The many aspects of the invention will be discussed in detail in connection with Figure 1 which is a schematic diagram of an embodiment of the invention for alkylating isobutane with butenes. Many pumps, valves, lines, and the like have been omitted in order to make important features of the invention stand out more clearly.

A liquefied mixed butanes-butenes stream (hereinafter referred to as a refinery B—B stream) recovered from the products of catalytic cracking of gas oils is passed from source 11 by way of line 12 into caustic scrubber 13 which contains an aqueous caustic solution for removing mercaptans, $H_2S$ and the like. The composition of the B—B stream from catalytic cracking will vary from unit to unit but typically may contain about 40% isobutane, 10% n-butane, 20% isobutene, 10-15% butene-1 and 15-20% butene-2. A B—B stream from thermal cracking or mixtures of such streams from catalytic and/or thermal cracking which may optionally be fortified with outside butane streams may also be used. The caustic washed B—B stream is removed from caustic scrubber 13 and passed by way of line 14 into settler 16 for the removal of entrained caustic solution. Settled caustic solution is removed from the bottom of settler 16 by way of line 17 and is in part returned to scrubber 13 by way of line 18 and in part discarded by way of line 19. The caustic washed B—B stream is removed from settler 16 and passed by way of line 21 into dryer 22 for the removal of water. The dried B—B stream is removed from dryer 22 and passed by way of line 23 to the isomerization step which is indicated herein as isomerization reactor 24.

During the isomerization step the butene-1 is isomerized to butene-2. Any effective olefin isomerization catalyst may be used for this purpose. Catalysts such as alkali metals, e.g. sodium, potassium, etc., or acid catalysts such as HF or HCl impregnated alumina, phosphoric acid, sulfuric acid, etc., may be employed. The isomerization is preferably carried out or concluded at a low temperature such as ambient atmospheric temperatures of 70° F. or thereabouts since the equilibrium favors butene-2 to a greater extent at low temperatures than it does at higher temperatures. It is also important to employ this isomerization step if the olefin mixture contains pentene-1 or hexene-1.

The B—B stream which now contains less than about 1% butene-1 is passed from the isomerization step by way of line 26 into scrubber 27 wherein water is used to remove any traces of occluded isomerization catalyst material. Waste water is discarded from scrubber 27 by way of line 28. The scrubbed liquid B—B stream is then passed by way of line 29 into settler 31 wherein traces of occluded water are removed and discarded from the system by way of line 32. The upper hydrocarbon layer is then passed from settler 31 by way of line 33 into dryer 34 for the removal of water from the B—B stream before it is passed by way of line 36 into the alkylation reaction zone.

The aluminum chloride-ether catalyst is prepared in vessel 37. While other methods may be employed for preparing the catalyst, the following method is preferred because it simplifies the materials handling problem and insures a catalyst of excellent activity and good activity maintenance. The catalyst so prepared may also be used in alkylating other isoparaffins such as isopentane or when alkylating with olefins other than butenes, for example when using ethylene, propylene, amylenes, etc. Aluminum chloride is introduced into vessel 37 from source 38 by way of valved line 39. Many various grades of aluminum chloride, ranging from technical aluminum chloride to C.P. aluminum chloride may be used. But with the more impure grades greater care must eventually be taken to insure complete saturation of the aluminum chloride-ether catalyst with aluminum chloride, and the catalyst may if desired be subjected to purification steps such as filtration, etc. to remove impurities caused by using the more impure forms of aluminum chloride. Lump or finely divided aluminum chloride, preferably the latter, can be employed. Liquid paraffinic hydrocarbon diluent having no more than about seven carbon atoms per molecule is then introduced into vessel 37 from source 41 by way of valved line 42. It is preferred to employ a lower molecular weight hydrocarbon such as liquefied isobutane, and the latter is employed in this embodiment. When higher molecular weight hydrocarbons such as octanes or higher, and especially branched chain paraffins of higher molecular weight are used as the diluent, reaction occurs between such diluent hydrocarbon and aluminum chloride especially as the temperature increases. This results in a loss of aluminum chloride because of the formation of an aluminum chloride-hydrocarbon complex. A small percentage (based on catalyst) of aluminum chloride-hydrocarbon complex may advantageously be present in the catalyst, but it is preferred to obtain this small amount by other methods rather than in this catalyst manufacture step.

The aluminum chloride is slurried within the isobutane diluent by means of mixers not shown herein. The low molecular weight ether which may be dimethyl ether, diethyl ether, methylethyl ether, or mixtures of such ethers (diisopropyl ether is not as satisfactory) is passed from source 43 by way of valved line 44 into vessel 37. In the embodiment described herein, a 50–50 volumetric mixture of dimethyl ether and diethyl ether are employed because the use of such mixtures has certain advantages which will be discussed later. The mixture of ethers is gradually added by way of valved line 44 while the contents of the vessel are stirred. A coolant such as cold oil (aqueous type coolants should preferably be avoided) is passed through cooling coil 46 which is positioned within vessel 37 in order to remove heat which is given off during the formation of the catalyst. This coolant travels through cooling coil 46 and then through cooler 47 wherein it is chilled and then passed again through the cooling coil within vessel 37. The ether mixture is added gradually to vessel 37 (which is operated under pressure to keep a large amount of isobutane liquid) to avoid hotspots, i.e. the rapid liberation of large quantities of heat. The temperature within vessel 37 is maintained lower than that at which any substantial amount (i.e. less than 2–5% based upon catalyst prepared) of aluminum chloride-hydrocarbon complex is formed, and preferably below that at which any detectable amounts are formed. A temperature below about 90° F., suitably about 70° F., is maintained in vessel 37. A reflux line 48 equipped with a cooler 49 may be associated with vessel 37 to remove additional quantities of heat and assist in regulating the temperature. In the embodiment illustrated herein, aluminum chloride and ether are employed in a quantity such that upon completion of the preparation of the catalyst, some aluminum chloride remains in the solid state within the mixture of liquids. While less aluminum chloride may be employed so that the aluminum chloride-ether composition is not fully saturated with respect to aluminum chloride (the finished composition may contain as little as one mole of aluminum chloride per mole of ether if desired), it is preferred to employ an amount of aluminum chloride which insures saturation of the aluminum chloride-ether.

By using a 1:1 mixture of methylether and ethylether in preparing the catalyst, the finished aluminum chloride-ether composition in vessel 37 is a mobile liquid at temperatures as low as 20–25° F. It presents no pumping problems. But if methylether or ethylether is used alone in making the catalyst, the resultant composition has a melting point of 70–80° F. and poses problems in transferring or pumping it in the alkylation system (presents problems such as pump erosion, clogging of lines, disruption of the entire alkylation process, etc.).

After all of the ether has been added, mixing of the vessel's contents is discontinued and a liquid catalyst layer is allowed to settle from an upper layer of liquid hydrocarbon. The pressure within vessel 37 is reduced, allowing isobutane to vaporize and pass overhead by way of line 51 for return to source 41. Liquid aluminum chloride-ether catalyst is removed from vessel 37 by way of valved line 52 and passed to a high temperature catalyst saturation step. The solid aluminum chloride still remaining in vessel 37 is preferably retained therein for the preparation of the next batch of catalyst. Two or more catalyst preparation vessels may be employed in series in the batch manner outlined, or a continuous catalyst preparation technique may be used.

The freshly prepared liquid catlyst (together with recycle catalyst which is introduced into line 52 by line 59) is passed by way of valved line 52 through heater 53 wherein its temperature is raised to about 130° F. and then to high temperature catalyst saturation step which is indicated herein as comprising vessel 54. Heater 53 consists of indirect heat exchange means in which a non-aqueous, e.g. hot oil, heating fluid is circulated. The use of hot water or steam should be avoided because leakage of water into the catalyst would ruin it. Aluminum chloride is introduced into vessel 54 from source 56 by way of valved line 57. A supply of solid aluminum chloride is maintained within this vessel. The liquid catalyst is agitated with solid aluminum chloride particles, by means not shown herein, at a temperature higher than that used in vessel 37, for example, above about 110° F. The temperature should be lower than that at which a substantial amount of the ether decomposes. Temperatures above about 180–200° F. are preferably avoided. A suitable temperature is about 130° F. The contacting of the liquid catalyst with the solid aluminum chloride is carried out for a period of time, e.g. 0.1 to 2 hours, which is sufficient to insure complete saturation of the catalyst with aluminum chloride. The liquid catalyst passes upwardly through vessel 54, becoming saturated with aluminum chloride as it passed upwardly, and reaches a settling zone in the upper portion of vessel 54 wherein the aluminum chloride particles settle out and flow downwardly. The liquid catalyst which has become saturated with aluminum chloride at the temperature of the high temperature saturation step is removed from the upper settling zone of vessel 54 and passed by way of line 58 to the alkylation reactor.

The purpose of the high temperature catalyst saturation step is to introduce into the alkylation reaction zone larger amounts of aluminum chloride than are soluble in the fresh and recycled catalyst. Because aluminum chloride is consumed in small amounts during the alkylation reaction by reason of forming aluminum chloride-hydrocarbon complex and reacting with impurities such as moisture, acetylene, etc. in the feed hydrocarbons, makeup aluminum chloride must be added to the alkylation reactor. If too little makeup is added, the conversion of olefin to alkylate falls off and the alkylation reaction will ultimately cease. The apparent role of the makeup aluminum chloride is to keep the liquid aluminum chloride-ether catalyst saturated with aluminum chloride while it is present in the alkylation zone. If fresh and recycle catalyst were not passed through the high temperature saturator, it would contain only sufficient aluminum chloride to sustain the alkylation reaction for a limited time. By using the high temperature saturator, additional aluminum chloride, which is sufficient to sustain the reaction, is dissolved in the liquid catalyst and carried into the alkylation reactor. This additional aluminum chloride necessary to sustain catalyst activity may be introduced into the alkylation reactor by other techniques, which, however, may not be as convenient or trouble-free. For example, aluminum chloride particles may be added to the cool (at alkylation temperature) recycle catalyst, or the isobutane feed to the reactor, or it may be added directly into the reactor in the form of fine particles.

The liquid catalyst is introduced by way of line 58 into alkylation reactor 61. A mixture of isomerized B—B stream and recycled isobutane is introduced into alkylation reactor 61 by way of line 62. The stream introduced by way of line 62 contains a small amount of a soluble aluminum chloride-ether composition (approximately an equimolar mixture of the aluminum chloride and ether) which has been recovered from a catalyst purification step which will be discussed later. A small amount of aromatic hydrocarbon is introduced from source 63 by way of valved line 64 into line 66 by which it is passed into line 62 and carried into the alkylation reaction zone. The alkylation is carried out in the presence of a minor amount (based upon isoparaffin and olefin) of an aromatic hydrocarbon. The presence of the aromatic hydrocarbon enables the aluminum chloride-ether catalyst to produce alkylate which has a clear F-1 octane number of 100–101 when alkylating isomerized butenes. In the absence of the aromatic hydrocarbon, the clear F-1 octane number of the alkylate is in the low 90's, and if the isomerization step is not employed the F-1 clear octane number of the alkylate will generally be in the high 80's. It is apparent that use of the aromatic hydrocarbon during the alkylation cooperates with the specific alkylation catalyst and the isomerization step to produce alkylates whose octane number is higher than expected and higher than that heretofore produced. It is preferred to employ a mononuclear hydrocarbon rather than a polynuclear aromatic hydrocarbon since some of the latter aromatics tends to produce a tarry material within the catalyst which reduces the activity of the catalyst. Aromatic hydrocarbons such as benzene, toluene, xylene, trimethyl benzenes, tetramethyl benzenes, pentamethyl benzenes, hexamethyl benzenes, ethyl benzene, diethyl benzenes, triethyl benzenes, hexaethyl benzene, isopropyl benzene, butyl benzene, dibutyl benzenes, styrene, alpha-methyl styrene, indene, indane, various mixtures of the above or similar aromatic hydrocarbons, etc., may be employed. Hydrocarbon fractions rich in aromatic hydrocarbons may be used. For example, a mixture of aromatic hydrocarbons e.g. hydroformate or such as may be obtained by fractionating hydroformate (or solvent extracting it) may be used.

The minor amount of aromatic hydrocarbon used may usually be employed in the amount between 0.001 and 2% by weight based upon the isoparaffin and olefin charged to the alkylation reaction. When based upon the amount of catalyst, the amount of aromatic may be from 1–50% based thereon. The particular aromatic used also has an effect on the amount employed. In general, the greater the number of alkyl substituents attached to the aromatic nucleus, the more effective is the aromatic in improving the alkylate octane number and the lesser is the amount that is needed. For example, when isobutane is alkylated with butene-2 in the presence of about 0.5% by weight (based on hydrocarbon feed) of a xylene-rich fraction of reformate, an alkylate of 101.0 F-1 clear alklate in 185% by weight yield based on olefin has been produced. Similar results are obtained when 0.25% by weight of a higher boiling fraction of reformate (boiling from about 270° F. to about 350–400° F.) rich in tri- and tetra-alkyl benzenes is used. It is preferred to add the aromatic hydrocarbon to the alkylation zone after the alkylation reaction has been started.

During the alkylation reaction the aromatic hydrocarbon becomes alkylated with the olefin present, thereby reducing the alkylate yield slightly. The alkylate can be rerun to recover a bottoms fraction boiling above 350 or 400° F. which is rich in the alkylated aromatic and is recycled. Rerunning is costly however, and by using a gasoline boiling range aromatic which has a large number of alkyl substituent groups, i.e. 3 or more (which renders the aromatic essentially non-alkylatable) the alkylate need not be rerun to make it commercially satisfactory by removing 400° F.+boiling hydrocarbons. In this latter situation fresh aromatic is always added, and slightly higher alkylate yields are obtainable.

As was indicated, aluminum chloride-hydrocarbon complex begins forming after the alkylation reaction has been on stream for a while. This liquid complex is miscible in the liquid aluminum chloride-ether catalyst and stays therein. The complex is a complicated composition of aluminum chloride with an unsaturated oil. When it is hydrolyzed, a polyolefinic oil commonly termed "red oil" is sprung. The presence of from 0.1 to 15 vol. percent or even somewhat more of the aluminum chloride hydrocarbon complex (as measured by red oil) in the catalyst is not harmful and in fact is beneficial in improving alkylate octane number, provided the aluminum chloride-hydrocarbon complex is not too viscous. It has an effect in such amounts similar to the aromatic hydrocarbon and can be used to replace a portion or all of the latter. When alkylating an isoparaffin with ethylene, the specified amounts of aluminum chloride-hydrocarbon complex causes an improvement in alkylate octane number.

The aromatic hydrocarbon does not have a beneficial effect during alkylation with all of the various olefins. When ethylene is alkylated, added aromatic prevents alkylation from occurring. With butene-1, pentene-1, or hexene-1, the presence of the aromatic hydrocarbon causes a lowering of the octane number of the alkylate. With propylene and secondary and tertiary olefins such as butene-2, pentene-2, isobutylene, isoamylene, etc. the presence of the aromatic causes a sizeable increase in the octane number of the alkylate. The effects noted above occur when alkylating isobutane, isopentane, etc.

Referring to alkylation reactor 61, an alkylation temperature at which catalyst is liquid is used. Temperatures of from 0° F. or below, up to 150–200° F. may be used. In general, the use of lower temperatures results in alkylate of higher octane number. Good results are obtained using temperatures of 20–80° F. A pressure sufficient to maintain reactants in the liquid phase, e.g. 50 to 1000 p.s.i.g. is used. The liquid aluminum chloride-ether catalyst may be used in an amount equal to the volume of hydrocarbon reactants, but liquid volumetric ratios of hydrocarbon reactants to catalyst of 5:1 to 100:1 are satisfactory. Good results are obtained at ratios of between 10:1 and 60:1. A xylene rich fraction of reformate is added (preferably after the reaction has been initiated) in the amount of about 0.5% based on $C_4$ feed. External isoparaffin/olefin ratios of 2:1 to 50:1 and internal ratios of 10:1 to 1000:1 such as are used in commercial alkylation processes may be used. Residence time in the alkylation reaction zone may be from less than a minute to more than 2 hours, depending upon the reactor, the hydrocarbon/catalyst ratio, etc. The time may suitably be 10–40 minutes. To assist in initiating the alkylation reaction, temperatures of 70–100° F. may be used, and after initiation the temperature may be lowered to the desired operating temperature of 30–70° F. Or a small amount of hydrogen chloride, or preferably methyl chloride, may be used to initiate alkylation.

In the embodiment illustrated herein, the reactants and catalyst are well mixed by stirring means in reactor 61. Any of the various type alkylation reactors may be used, alone or in series or parallel flow. The reactor is cooled, by means not shown herein, to remove heat and maintain a nearly constant reaction temperature. A separate refrigeration system, autorefrigeration, or cooling by flashing hydrocarbon alkylation products (suitably after the bulk of the catalyst has been separated therefrom) within cooling coils in the reactor, can be used to extract heat from the alkylation reactor. An effluent stream of mixed hydrocarbons and catalyst is withdrawn from the reactor and passed by way of line 67 to settler 68. The effluent stream consists of unreacted hydrocarbons, alkylate, and catalyst. While most of the catalyst is merely thoroughly admixed with liquid hydrocarbons and settles therefrom the liquid hydrocarbons contain a minor amount, e.g. 0.2 to 2% by weight of dissolved catalyst components. The dissolved catalyst components consist of aluminum chloride and ether, usually in about a 1:1 molar ratio. The effluent stream is stratified in settler 68 into an upper liquid hydrocarbon layer and a lower liquid catalyst layer. The catalyst is removed and passed by way of line 59 into line 52 by which it is introduced into the high temperature catalyst saturator and subsequently returned to the alkylation reactor. A portion, e.g. 2–20%, of the liquid catalyst in line 59 is diverted and passed by way of line 69 to a purification zone wherein aluminum chloride-hydrocarbon complex is removed from the alkylation system.

The upper liquid hydrocarbon layer is removed from settler 68 and passes through line 71 which contains a pressure-reducing valve. Thereafter the hydrocarbons are passed into vessel 73. Reduction of the pressure upon the liquid hydrocarbons causes the low boiling hydrocarbons present therein to vaporize by a flashing effect. A cooling effect is obtained by reason of the vaporization of low boiling hydrocarbons, principally isobutane. This cooling effect can be used to chill the hydrocarbon reactants to the alkylation process, or the contents of line 71 can be passed into and through cooling coils located in the alkylation reactor. The liquid hydrocarbons in vessel 73 are cooled down to about 30–35° F. Vessel 73 serves to separate the liquid from the gas. Knockout drum 76 is connected with vessel 73 by means of line 74 to permit liquids to fall back into vessel 73. The overhead gas from knockout drum 76 passes by way of line 77 to the suction side of compressor 78 which maintains the reduced pressure from this point back to the pressure-reducing valve in line 71. The gases are compressed in compressor 78, passed by way of line 79 to cooler 81, and then passed by way of line 82 into vessel 83 wherein liquid is collected. The hydrocarbon liquid (which is rich in isobutane) is then passed by way of line 84 into line 66 by which it is returned to the alkylation reactor. A slipstream is removed from line 84 and passed by way of line 85 into depropanizer 86. Propane is removed from the system by line 87. A hot bottoms stream rich in isobutane is removed from depropanizer 86, passed by way of line 88 to cooler 89, and thereafter passed by way of line 91 into line 66 by which it is returned to the alkylation reactor as a portion of the isobutane charge thereto. When desired, a portion of this stream can be diverted to the purification step, to be discussed hereinafter, wherein aluminum chloride-hydrocarbon complex is removed from the alkylation system.

The chilled liquid in vessel 73, which is at a temperature of about 30–35° F., is passed by way of line 92 into settler 93. A lower liquid phase comprised of aluminum chloride and ether components of the catalyst (usually in about a 1:1 molar ratio) is removed from the bottom of the settler and passed by way of line 94 into line 59 by which it is passed to the high temperature catalyst saturator and ultimately is returned to the alkylation reaction zone. The catalyst components which are recovered from settler 93 may consist of about 60–80% of the catalyst components which had been soluble in the liquid hydrocarbon alkylation products. Cooling of the liquid hydrocarbon alkylation products from the alkylation temperature of about 60° F. down to about 30–35° F. reduces the solubility of the catalyst components in the liquid, and reducing the volume of the liquid hydrocarbons by vaporizing off the low boiling components throws additional amounts of the catalyst components out of solution. By employing a mixture of dimethyl ether and diethyl ether in preparing the aluminum chloride-ether catalyst, the resultant catalyst has a melting point of about 20–25° F. The catalyst components recovered from settler 93 are liquid. If either of the ethers were employed individually in making the catalyst, the catalyst components from settler 93 would exist as a solid since the catalysts prepared therefrom have melting points of 70–80° F. Since the removal of solids from a liquid generally presents more difficult engineering problems, it is evident that use of an equal volume mixture of dimethyl ether and diethyl ether (dimethyl ether content may be from 25 to 75% and diethyl ether content may range from 75 to 25%) provides technical advantages in the alkylation process.

The liquid hydrocarbons are passed from settler 93 through line 96 which contains a pressure-reducing valve. Vaporization of low-boiling hydrocarbons occurs in vessel 97 into which this stream of hydrocarbons is introduced. At the reduced pressure maintained in vessel 97, sufficient low boiling hydrocarbons are vaporized so as to reduce the temperature of the remaining liquid hydrocarbons in vessel 97 to about 15° F. or lower and to such temperatures as may be below the melting point of the aluminum chloride-ether catalyst components present in the chilled liquid hydrocarbons. Below the melting point, solid particles of an aluminum chloride-ether composition (which usually exists as a complex of one mole of aluminum chloride with one mole of ether) are formed. The stream of liquid hydrocarbons containing the solid particles of the aluminum chloride-ether composition are removed from settler 97 and passed by way of line 98 into liquid cyclone 99. One or more of these liquid cyclones which is used to separate the solid particles from the liquid hydrocarbons, may be employed, either in series and/or in parallel arrangement. Liquid cyclones are well-known to those skilled in the art and are described for example, in Chemical Engineering Progress 48, No. 2, p. 75. From the bottom of liquid cyclone 99 there is removed a slurry of gelatinous and solid particles of the aluminum chloride-ether composition in oil. This slurry is passed by way of line 101 into line 102 wherein it meets liquid isobutane and is carried thereby as a part of the isobutane charge to the alkylation reactor. In place of the liquid cyclones, other means such as a combination of settling plus decantation, filtration, or other means known to those skilled in the art can be employed. In the second vaporization cooling stage, approximately 40 to 70% of the remaining soluble aluminum chloride-ether composition is recovered from the liquid hydrocarbons. The process thus enables recovery of 90% or more of the aluminum chloride-ether composition which was soluble in the liquid hydrocarbons removed from the alkylation reactor. A considerable economic advantage is thereby obtained.

The gaseous hydrocarbons under a reduced pressure pass upwardly from vessel 97 by way of line 103, through knockout drum 104 wherein entrained liquids collect and fall back into vessel 97. From the knockout drum the gases pass by way of line 106 into the suction side of compressor 107 which maintains the reduced pressure in line 106 back through the system to the pressure-reducing valve in line 96. The compressed gases are passed from compressor 107 by way of line 108, through cooler 109, through line 111 into receiver 112. The liquid hydrocarbons in receiver 112, which are rich in isobutane, are then passed by way of line 113 into the purification section wherein aluminum chloride-hydrocarbon complex is removed from the alkylation system.

As has been pointed out, during the course of the alkylation reaction aluminum chloride-hydrocarbon complex is formed. Because it continues to build up during continuous alkylation, it must be removed in order to maintain a content of less than about 20% e.g. about 10% in the aluminum chloride-ether catalyst. Because it is miscible with the catalyst it cannot be removed therefrom by conventional techniques. By withdrawing a portion of the recycle catalyst containing the aluminum chloride-hydrocarbon complex and washing it with a liquified normally gaseous paraffin hydrocarbon such as isobutane, the liquified hydrocarbon dissolves aluminum chloride and ether catalyst components in preference to the aluminum chloride-hydrocarbon complex. The composition dissolved by the liquified gaseous paraffinic hydrocarbon appears to be an equi-molar complex of aluminum chloride with ether, such as is also recovered during cooling of the liquid hydrocarbon alkylation products. The aluminum chloride which is dissolved in this aluminum chloride-ether complex, and which dissolved aluminum chloride apparently functions as the highly active catalytic agent, does not appear to dissolve to any substantial extent in the wash hydrocarbon. When using liquified isobutane as the normally gaseous paraffin hydrocarbon, the aluminum chloride-ether composition (i.e. apparently the equimolar complex) dissolves in liquid isobutane to the extent of about 0.5 to 1.0% by weight. More dissolves at higher washing temperatures. The aluminum chloride hydrocarbon complex is soluble only to the extent of about 0.01% by weight. Similar to the aluminum chloride-hydrocarbon complex, aluminum chloride itself is highly insoluble. The aluminum chloride which is not complexed either with the ether or hydrocarbon serves the advantageous function of reacting with impurities such as water, acetylene, etc., which are present in the liquified isobutane.

An isobutane-rich liquid in line 113 is introduced into mixing vessel 114 wherein it is agitated with an aluminum chloride-ether catalyst which is rich in aluminum chloride-hydrocarbon complex. The mixture is then removed from mixing vessel 114 and passed by way of line 116 into settler 117 wherein a lower layer which is primarily aluminum chloride-hydrocarbon complex is removed and discarded from the system by way of line 118. An upper layer of liquified isobutane containing dissolved aluminum chloride-ether composition (1:1 complex) is withdrawn from settler 117 and passed by way of line 119 into mixing vessel 121. A portion of the recycle catalyst to the alkylation reactor is introduced into mixing vessel 121 by way of line 69. The amount (which may usually be 2–20% of the recycle catalyst in line 59) which is so introduced depends upon the rate of formation of aluminum chloride-hydrocarbon complex in the catalyst, which in turn depends upon the alkylation reaction conditions such as temperature, etc. It is preferred to pass a slip stream of recycled catalyst into mixing vessel 121 at a rate such that the available liquified isobutane which contacts it will dissolve substantially all of the aluminum chloride-ether composition present therein. When extremely high rates of aluminum chloride-hydrocarbon complex removal are necessary, a separate washing system may be used. In this separate closed system, the liquified hydrocarbon containing dissolved aluminum chloride-ether composition such as is removed from vessel 123 is then vaporized, the aluminum chloride ether composition recovered and the gas liquified and reused. Returning to this embodiment, the liquified isobutane containing dissolved aluminum chloride-ether composition along with some aluminum chloride-hydrocarbon complex is passed from mixer 121 by way of line 122 into settler 123. A lower aluminum chloride-ether layer rich in aluminum chloride hydrocarbon complex is removed from the settler and passed by way of line 124 into mixing vessel 114. The upper hydrocarbon layer from settler 123 is passed by way of line 126 into line 102 by which it is introduced into line 66, then through a cooler and then into the alkylation reactor.

The liquid hydrocarbons are removed from cyclone 99 and passed by way of line 127 into water washing vessel 128 wherein traces of aluminum chloride are removed. The water washed oil is then passed by way of line 129 into the fractionation train. An outside isobutane stream from source 131 is passed by way of line 132 into line 129 and also introduced into deisobutanizer tower 133. An overhead stream is removed from deisobutanizer 133 by way of line 134, condensed by means not shown herein, and then passed into dryer 136. The dried liquid isobutane stream is then passed by line 137 into line 113 where it is employed in the aluminum chloride-hydrocarbon complex removal system. The bottoms stream from deisobutanizer 133 is passed by way of line 138 into debutanizer 139. Butane is removed overhead by way of line 141 and discarded from the system. A $C_5+$ alkylate is removed from the bottom of debutanizer 139. When gasoline boiling range trialkyl benzenes or tetraalkyl benzenes are employed as the aromatic hydrocarbon during the alkylation process, this stream will usually be suitable for blending into product gasoline. It has an octane number of 100 F–1 clear. In the embodiment illustrated herein, the xylene employed becomes alkylated so that a portion of it boils above the gasoline boiling range. It is desirable to remove this material from the alkylate and the stream in line 142 is therefore passed into a fractionation system indicated herein as fractionator 143. A small amount of a bottoms stream rich in aromatics and boiling above the gasoline boiling range is removed from fractionator 143 and passed by way of line 148 into line 66 by which it is returned to the alkylation reactor. A small amount of the aromatic bottoms from fractionator 143 can be purged from the system by line 145. The remaining alkylate can be recovered overhead and used for blending or it can be further fractionated to produce high octane fractions therefrom. Hydrocarbon components boiling below about 180 to 200° F. can be removed overhead by way of valved line 144. Only about 5% of the C–5 plus alkylate is thus removed, but the remaining alkylate which can be removed by way of line 147 has an octane number of 100.5 F–1 clear. It is also possible to fractionate the alkylate at a cut point of about 220° F. The overhead alkylate which comprises about 50 to 60% of the C–5 plus alkylate charged to fractionation will have an octane number of about 98.5, and the remaining alkylate which is withdrawn by way of valved line 147 will have an octane number of about 101.5 F–1 clear. A select high octane fraction of the alkylate which boils between about 220° and 240° F. can also be recovered from line 146 for blending purposes when desired. It will have an octane number of approximately 103.3 F–1 clear.

Figure II illustrates an additional embodiment whereby the hydrocarbon alkylation products are cooled to cause aluminum chloride and ether components which are soluble in the liquid hydrocarbons to become insoluble therein. This embodiment may be employed as a substitute for the embodiment in Figure I which is enclosed by the dashed lines. After introducing hydrocarbon reactants by way of line 62 and catalyst by way of line 58 into alkylation reactor 61 and therein carrying out the alkylation reaction, an effluent stream of liquid isoparaffin-olefin alkylation products together with unreacted isobutane, aluminum chloride-ether catalyst, and aluminum chloride-hydrocarbon complex is removed from the alkylation reactor by way of line 149. The effluent stream is passed by way of line 149, through a pressure-reducing valve wherein the pressure on the effluent stream is lowered, and then into heat exchange means 151 which is located within alkylation reactor 61. Reduction of the pressure causes vaporization of low-boiling hydrocarbons, principally isobutane, during the passage of the effluent stream through the heat exchanger tubes. The liquid hydrocarbons which pass through the heat exchanger tubes are thus cooled and the cooling effect plus the reduction of the total amount of liquids causes a substantial part of the aluminum chloride-ether composition which was soluble in the liquid hydrocarbons to become insoluble therein. In addition the chilled liquids within the tube 151 which may be at a temperature of 30–35° F., removes heat from the alkylation reaction zone and enables the maintenance of a uniform low temperature within the alkylation reactor. The mixture of liquid and gaseous hydrocarbons and liquid catalyst phase is then removed from heat exchange means 151 and passed by way of line 152 into vessel 73 wherein gases are removed overhead by way of line 74 and liquids pass downwardly by way of line 92 into settler 93. The remainder of the operation follows that discussed in connection with Figure I. This embodiment is particularly useful wherein the aluminum chloride-ether catalyst is prepared from a single ether such as dimethyl ether. The presence of the aluminum chloride-hydrocarbon complex within the aluminum chloride-ether catalyst reduces the freezing point of the catalyst phase down to as low as —40° F., depending upon the particular amount and type of aluminum chloride-hydrocarbon complex present. Because of the high ratios of hydrocarbon reactants to aluminum chloride-ether catalyst which may ordinarily be used e.g. volumetric ratios of 20:1 to 60:1 are suitable, the presence of the catalyst phase within the heat exchange tubes is not disadvantageous. If the aluminum chloride-ether catalyst is prepared from an individual ether such as dimethyl ether or diethyl ether (so that the catalyst would have a relatively high melting point of 60-80° F.) and if the effluent stream in line 149 was first passed to a settler from which a liquid catalyst layer was separated from a liquid hydrocarbon layer and the liquid hydrocarbon layer was then passed through line 149 through the pressure-reducing valve and into the heat exchanger tubes 151 then the aluminum chloride-ether composition which was soluble in the liquid hydrocarbons would become solidified in part and would cause problems of plugging the heat exchanger tubes. The embodiment in Figure II provides a solution which avoids such problems.

A number of alkylation runs were carried out which illustrates certain aspects and advantages. The data presented in Table I illustrate the importance of isomerizing terminal olefins to secondary olefins prior to employing them in the alkylation process wherein the aluminum chloride-ether catalyst is used. In runs 1 and 2 the catalyst was prepared by passing gaseous dimethyl ether into a Dry Ice-cooled flask containing aluminum chloride. Eventually a separate liquid phase was formed containing aluminum chloride in solution and in suspension in the form of particles. The catalyst contained approximately 80 wt. percent aluminum chloride and 20 wt. percent dimethyl ether which corresponds to about 1.4 moles of aluminum chloride per mole of dimethyl ether. The liquid catalyst containing suspended aluminum chloride particles was introduced into the alkylation reactor. The alkylation conditions employed in these runs were a temperature of about 75° F., an isoparaffin-olefin ratio of about 3.3:1, about 50 volumes of liquid hydrocarbon reactants per volume of liquid catalyst, and 0.5 wt. percent hexaethylbenzene based upon isobutane and olefin. In runs 3 and 4 the aluminum chloride-ether catalyst was prepared by introducing aluminum chloride particles into a pressure vessel, passing liquified isobutane under pressure into the vessel, then adding dimethyl ether and diethyl ether to the vessel (equal volumes of the two ethers were used) while stirring and holding the temperature down to about room temperature. Sufficient aluminum chloride was used so that solid particles thereof were present in the bottom of the vessel after all of the ether has been introduced. Isobutane was removed by reducing the pressure within the vessel, and the catalyst was then heated to about 120° F. The contents were then allowed to collect and a liquid was decanted in the vessel at about room temperature and used as the catalyst. In runs 3 and 4 an alkylation temperature of 50–60° F. and isoparaffin-olefin ratio of 4:1, a hydrocarbon to catalyst ratio of 40:1, and about 1% of hexaethylbenzene based upon isoparaffin and olefin. In all of the alkylation runs the last ingredient to be added was the olefin. The results obtained in these runs are shown in Table I which follows:

TABLE I

*Effect of isomerization*

| Run No. | Olefin | Catalyst | Octane Number F-1 clear |
|---|---|---|---|
| 1 | butene-1 | AlCl$_3$-Ether | 66.2 |
| 2 | butene-2 | AlCl$_3$-Ether | 99.0 |
| 3 | pentene-1 | AlCl$_3$-Ether | 46 |
| 4 | pentene-2 | AlCl$_3$-Ether | 95 |

The great importance of isomerizing terminal olefins to secondary olefins prior to using the aluminum chloride-ether catalyst in alkilating an isoparaffin with the olefins is evident from the above data. The preceding isomerization step results in an improvement of from 33 to 49 octane numbers. This effect of isomerization is practically negligible as regards the octane number of the alkylate when other catalysts such as sulfuric acid, BF$_3$, etc., are used.

Another series of runs was carried out which show the influence of the aromatic hydrocarbon during the alkylation of isoparaffin with various olefins. In runs 5 through 8 and 13 through 18, catalyst prepared in the same manner as that described for runs 1 and 2 was used. The same alkylation conditions, except as noted in Table II, were used in these runs as were used in runs 1 and 2. In runs 9 through 12 the catalyst was prepared in the same manner as was the catalyst that was used in runs 3 and 4. The reaction condition for runs 9 through 12 were the same as those used in runs 3 and 4 except where noted in Table II. In runs 19 through 22 the alkylation conditions were the same as employed for runs 1 and 2. The catalyst used in runs 19 and 20 was made by adding 5 grams of HF to 10 ml. of an equimolar BF$_3$-ether solution. The catalyst used in runs 21 and 22 was made by saturating 48% aqueous hydrofluoric acid with BF$_3$ under 100 p.s.i.g. The results obtained in these runs are shown in the following table:

TABLE II

*Effect of aromatic hydrocarbon*

| Run No. | Catalyst | Amount of Aromatic [1] | Olefin | Octane F-1 clear |
|---|---|---|---|---|
| 5 | AlCl$_3$-ether | 1% | butene-2 | 99.0 |
| 6 | AlCl$_3$-ether | None | butene-2 | 89.9 |
| 7 | AlCl$_3$-ether | 0.5% | butene-1 | 66.2 |
| 8 | AlCl$_3$-ether | None | butene-1 | 71.9 |
| 9 | AlCl$_3$-ether | 1% | pentene-2 | 94.9 |
| 10 | AlCl$_3$-ether | None | pentene-2 | 88 |
| 11 | AlCl$_3$-ether | 1% | pentene-1 | 46 |
| 12 | AlCl$_3$-ether | None | pentene-1 | 48 |
| 13 | AlCl$_3$-ether | 1% | isobutene | 97.2 |
| 14 | AlCl$_3$-ether | None | isobutene | 93.7 |
| 15 | AlCl$_3$-ether | 1% | propene | 87.9 |
| 16 | AlCl$_3$-ether | None | propene | 80.5 |
| 17 | AlCl$_3$-ether | 1% | ethene | no reaction |
| 18 | AlCl$_3$-ether | None | ethene | 94.0 |
| 19 | BF$_3$-ether-HF | 0.5% | butene-2 | 90.6 |
| 20 | BF$_3$-ether-HF | None | butene-2 | 90.1 |
| 21 | BF$_3$-H$_2$O-HF | 0.5% | butene-2 | 85.9 |
| 22 | BF$_3$-H$_2$O-HF | None | butene-2 | 85.7 |

[1] Wt. percent based on isobutane and olefin charged. n-Xylene was the aromatic used, except in runs 7, 9, 11, 19 and 21 where hexaethylbenezene was used.

Another series of alkylation runs was carried out in which a catalyst made from a mixture of dimethyl ether and diethyl ether was used. A series of runs was carried out at successively lower temperatures, using fresh catalyst in each run as was the practice in all of the runs recorded herein. In the runs reported in Table III a batch of catalyst was prepared by vaporizing 75 volume percent dimethyl ether and 25 volume percent diethyl ether mixture and passing the vapors at about 100° F. into a vessel containing aluminum chloride particles. The contents of the vessel were stirred and kept at a temperature below 130° F. Sufficient aluminum chloride was initially present in the vessel so that after all of the ether was added, about 90% of the aluminum chloride had dissolved in the liquid catalyst but about 10% remained undissolved at the temperature of 120–130° F. The contents of the vessel were cooled to about room temperature, and the liquid catalyst plus the remaining solid particles was added to the alkylation reactor. In runs 25 through 27 a 4:1 isoparaffin/olefin ratio was used and a 30/1 hydrocarbon to catalyst ratio was employed. No aromatic hydrocrbon was added in these runs. In runs 28 and 29 the reaction conditions comprised a 4:1 isoparaffin/olefin ratio, hydrocarbon catalyst ratio of 40:1, and 0.7 wt. percent hexaethylbenzene based upon isoparaffin and olefin. The results obtained are shown in Table III which follows:

TABLE III

| Run No. | Temperature, °F. | Olefin | Octane Number F-1 clear |
|---|---|---|---|
| 25 | 40 | ethene | 97.1 |
| 26 | 30 | ethene | 99.0 |
| 27 | 20 | ethene | 100.9 |
| 28 | 60 | butene-2 | 99.8 |
| 29 | 30 | butene-2 | 100.9 |

It is evident that by preparing the aluminum chloride-ether catalyst from a mixture of dimethyl ether and diethyl ether, a lower alkylation temperature can be used (without the danger of causing the catalyst to solidify and become virtually inactive) and thereby produce alkylate of higher octane number. To illustrate the point further, alkylation runs were attempted at about 40° F. using catalyst prepared from dimethyl ether alone and from diethyl ether alone. Essentially no alkylation occurred because of solidifying of the catalyst.

Gasoline boiling range alkylate which had been made by alkylating isobutane in the presence of a small amount of aromatic hydrocarbon and using primarily butene-2 as the olefin was fractionated in a precise fractionation column having an effect of more than 100 plates. Various boiling range fractions were recovered and their octane numbers were determined. These results are shown in the following table:

TABLE IV

*Alkylate fractionation*

| Fraction | Boiling Range, °F. | Octane Number F-1 clear |
|---|---|---|
| A | 110–210 | 97.8 |
| B | 210–212 | 100.3 |
| C | 212–237 | 103.3 |
| D | 237–347 | 100.2 |
| Total | 110–347 | 99.9 |

It is evident that low octane components are present in the lower boiling portion of the alkylate e.g. boiling up to about 200° F. It is also evident that Fraction C has an octane number which is surprisingly higher than the other fractions. This same boiling range fraction of a sulfuric acid alkylate has a lower octane number than does Fraction B from a sulfuric acid alkylate.

While the invention has been described in the embodiment with respect to the alkylation of isobutane with butenes, it is apparent that other isoparaffins and olefins may be used and that such are included within the scope of the present invention.

Thus having described the invention what is claimed is:

1. In an alkylation process wherein an isoparaffin and olefin are introduced into an alkylation reaction zone and therein intimately contacted in the liquid phase with an alkylation catalyst under alkylation reaction conditions thereby forming isoparaffin-olefin alkylation products, the improvement which comprises employing as the alkylation catalyst a liquid composition of aluminum chloride with dimethyl ether and diethyl ether, said catalyst containing a molar ratio of aluminum chloride to ether which is in excess of one, and the relative amounts of dimethyl ether to diethyl ether in the catalyst ranging between about 75% dimethyl ether and 25% diethyl ether by volume to about 25% dimethyl ether and 75% diethyl ether by volume.

2. The process of claim 1 wherein the volumetric ratio of dimethyl ether to diethyl ether is about 1:1.

References Cited in the file of this patent

UNITED STATES PATENTS

| | | |
|---|---|---|
| 2,338,568 | Bartlett | Jan. 4, 1944 |
| 2,363,264 | Rosen | Nov. 21, 1944 |
| 2,368,653 | Francis | Feb. 6, 1945 |
| 2,378,733 | Sensel | June 19, 1945 |
| 2,406,622 | Mavity | Aug. 27, 1946 |
| 2,415,733 | d'Ouville | Feb. 11, 1947 |
| 2,477,290 | Dornte et al. | July 26, 1949 |
| 2,539,350 | Gorin et al. | Jan. 23, 1951 |
| 2,591,367 | McAllister | Apr. 1, 1952 |
| 2,664,452 | Putney | Dec. 29, 1953 |
| 2,804,489 | Pines et al. | Aug. 27, 1957 |
| 2,824,160 | Knight et al. | Feb. 18, 1958 |
| 2,897,248 | Roebuck et al. | July 28, 1959 |

FOREIGN PATENTS

| | | |
|---|---|---|
| 559,199 | Great Britain | Feb. 9, 1944 |